United States Patent Office 3,117,007
Patented Jan. 7, 1964

3,117,007
SMOKE FLAVORED CEREAL PRODUCT AND
PROCESS FOR MAKING SAME
Clifford M. Hollenbeck, Manitowoc, Wis., assignor, by mesne assignments, to Red Arrow Products Corporation, Milwaukee, Wis., a corporation of Wisconsin
No Drawing. Filed Oct. 9, 1961, Ser. No. 143,571
2 Claims. (Cl. 99—93)

This invention relates to a smoke flavored product which can be added to food as a substitute for, or a supplement to, the regular smoke-house process. More specifically, it relates to a smoke flavored malt product and its use in food. This application is a continuation-in-part of my application Serial No. 796,729, filed March 3, 1959, now abandoned.

An object of this invention is to provide a method for producing a wholesome, palatable, standardized smoke flavor material from a cereal product such as malt.

Another object of this invention is to give better control of the flavor of smoked food.

The use of smoke to flavor and preserve food is well known and has been practiced since the very early ages. The hanging of meats, fish, cheese, etc. in a dense cloud of wood smoke gives these foods an attractive smoke flavor as well as increased keeping quality. The increased keeping quality is attributed to the fact that the constituents of smoke that deposit on the surface of the food has appreciable bacteriostatic effect which inhibits the spoilage of the smoked food. It is generally recognized in the food industry, especially the smoked meat and fish industry, that there are many variables influencing the degree of deposition on or penetration of the smoke into the food and, therefore, the subsequent flavoring and preserving quality of the smoke deposit. For example, the intensity of the smoke cloud, the type of food being smoked, the moisture content of the food, the temperature, the type of wood, and several other factors influence the effectiveness of the smoking process and account for the difficulty in controlling the flavor and keeping qualities of smoke flavored foods. In some stuffed cured meats, for example, the meat is cured and smoked while in a semi-permeable casing which prevents good penetration and deposit of the smoke flavor into the meat unless it is smoked for a long period of time. For this reason a need exist for a good natural smoke flavored material which can be added to foods in known, controlled amounts.

Although there are some artificial smoke flavors or pyroligneous liquors used in the manufacture of smoke flavored foods, in general the main method of adding smoke flavor to foods is by placing the food in some type of smoke filled compartment. The smoke constituents deposit on the surface and to some extent penetrate into the food. The smoke for these compartments (smokehouses) is usually generated by burning sawdust of hardwoods such as hickory or maple. Smoke can also be generated by means of friction between two blocks of hardwood or it can be generated by placing sawdust on a hot plate. The present invention is not limited to any particular means of generating smoke.

The application of which this is a continuation-in-part was a continuation of, and improvement over, my application, Serial No. 728,762, filed April 16, 1958, now abandoned for a Smoke Flavored Cereal Product and Process for Making Same, now abandoned.

In the earlier application Serial No. 728,762 a process for smoking freshly germinated, undried, whole (green) barley malt was described. An attractive feature of this process was the deposition of the smoke tars on the malt husk, and subsequent removal of these tars with the husk during the milling process. A disadvantage of the process, however, was the limitation on the intensity of the smoke flavor produced by the penetration of the smoke through the malt husks. In other words, a very pleasant, mild, smoke flavored malt meal was produced, but in the process described it was found difficult to increase greatly the intensity of the smoke flavor. In the improved process described herein, however, an equally pleasant smoke flavored malt meal is produced and the smoke flavor can be greatly intensified. The advantage of the more intensely flavored product lies mainly in its use at lower levels as a flavor adjunct in other foods.

A brief description of my improved process for producing a smoke flavored malt product includes, mixing flour or meal from a de-husked, barley malt with an aqueous extract of smoke from a hardwood, such as maple or hickory, partially drying the resulting batter in an atmosphere of wood smoke to a moisture content of about 20%, and thereafter drying the smoked product with a stream of warm, dry air. The undesirable, insoluble tars are removed from the aqueous extract of smoke by filtering through multiple layers of fine mesh cloth. This removal of the tars from the aqueous smoke extract, and the partial drying of the malt flour batter in a rapidly moving stream of smoke (with a minimum of tar deposition on the product) removes the necessity of smoking the whole malt with the inherent use of the husk to filter out the tars. Starting with a malt meal (or flour) greatly increases the contact of the individual malt particles with the flavor component (smoke) as compared to the process starting with whole malt kernels and consequently increases greatly the intensity of the smoke flavor.

I have found that barley malt meal or flour is unique for the preparation of a smoke flavored cereal product, since the pleasant, attractive flavor of the malt supplements and improves greatly the "smoky" aspect of the finished product. With cereal flours, like wheat or barley flour, the flavor of the flour itself is too prominent for a smooth, smoky flavor. Furthermore, it is highly desirable to have a non-glutinous batter such as produced by malt flour for its ease of mixing and drying. Other grain flours have been tried, but for either or both, of the above two reasons malt flour produces a superior product. There is a good likelihood that if other cereal grains were malted prior to milling into flour satisfactory smoked products could be produced from them.

Some examples of the method for producing this improved smoke flavored malt material and uses for it in enhancing the flavor and keeping qualities of foods are given in the following examples. These examples, of course, are merely illustrative and should not be construed as the only methods and uses and, therefore, should not limit the scope of this invention.

EXAMPLE I

An aqueous extract of smoke was prepared by passing the smoke from smoldering maple sawdust upward through a ceramic column counter-current to a spray of water. In order to insure intimate contact of the smoke and water the column was packed with multiple layers of glass fiber. The smoked flavored water was collected at the bottom of the column, cooled to 40° to 60° F., and re-cycled back through the column. The smoke extraction was continued until the acid content of the extract was about 1.8%, calculated as acetic acid. The undesirable, insoluble tars were removed from the aqueous smoke extract by filtration through multiple layers of a fine mesh cloth. One part by weight of diastatic barley malt flour was mixed into a smooth batter with 1.25 parts of the filtered, aqueous smoke extract. The batter was spread on an aluminum tray to a layer of ⅛ to ¼" in depth, partially dried in an oven at about 100 to 120° F., through which was passed a rapidly moving stream of wood smoke during a period of about two hours, or until the moisture content of the batter was about 20%. The smoked batter was dried further by passing a stream of warm, dry air (about 120° F.) through the oven until the moisture content of the dried malt meal was about 7 to 12%. The dried product was milled into a free-flowing granular meal passing a 40 mesh screen.

The analytical results from the finished smoked malt meal product produced in eight different trials using this procedure are shown in Table I.

*Table I*

| Trial | Moisture (Percent) | Reducing Sugar [1] (mg./10 g.) | Total Acidity [2] (Percent) | Phenols [3] (mg./10 g.) |
|---|---|---|---|---|
| A | 7.5 | 775 | 1.8 | 22.4 |
| B | 10.0 | 835 | 1.6 | 21.0 |
| C | 8.4 | 850 | 1.5 | 15.6 |
| D | 12.8 | 980 | 1.2 | 14.0 |
| E | 10.0 | 800 | 1.5 | 14.2 |
| F | 12.4 | 1,050 | 1.6 | 15.0 |
| G | 9.4 | 1,180 | 1.9 | 20.3 |
| H | 12.4 | 930 | 1.3 | 14.3 |

[1] Expressed as milligrams maltose in 10 grams of product (Cereal Laboratory Methods, fifth edition p. 32).
[2] Expressed as percent acetic acid (multiple extraction with water and electrometrically titrating with standard alkali).
[3] Expressed as milligrams of 2,6 dimethoxy phenol (Gibbs—Journal of A.O.A.C. 25 779, 1942) in 10 grams of product.

It is not advantageous to continue smoking beyond drying to about 20% moisture content for the following reasons: (1) the smoke passing over the surface of the batter is not as effective in drying as plain warm, dry air and the smoke is more difficult to control. (2) The flavor of the resulting product is not as good as when the final drying is in smoke-free air. While the reason for the adverse effect on flavor is not positively known, a reasonable theory appears to be that the undesirable tar ingredients of smoke keep steam distilling out of the product while the product is moist while deposited tars remain on the dry product and impart a phenolic flavor to the product.

EXAMPLE II

Similar products to that produced in Example I were prepared by the procedure in Example I, except wheat flour, barley flour, rye flour and soya flour were used instead of barley malt flour. The resulting smoke flavored products were found to be more difficult to mix into a smooth batter, and consequently more difficult to dry into uniform products. Furthermore, the flavor of these unmalted cereal and legume flours did not supplement the smoke flavor as did the barley malt flour. The unmalted flour imparted a strong "cereal" background flavor to the product which overpowered the "smokiness" when added to a food product, like chopped meat.

One of the significant changes that occurs during the malting of a cereal is the formation of dextrins and sugars from the cereal starch. Barley malt flour, for example, contains from three to ten times more reducing sugar than unmalted barley flour or unmalted wheat flour. Accordingly, it was found that the addition of 5 to 10% sugar (either dextrose or maltrose) to the flour product prior to adding the smoke flavor mellowed somewhat the cereal flavor of wheat flour or barley flour, and enhanced the desirable smokiness of the finished smoke flavored product. Even with the sugar added, however, the unmalted cereal flour did not quite match the desirable flavor qualities of malt flour as a "flavor-enhancer" carrier for the smoke flavor. Nevertheless, this experiment does demonstrate that probably part of the unique qualities of malt flour as a carrier for smoke flavor is its reducing sugar content.

EXAMPLE III

Beef steak, pork chops and hamburgers were given very attractive wood smoke flavors and odors by sprinkling a thin coat of the smoke malt meal on the surface of the meat, or in the case of the hamburger, incorporating about 0.1% to about 1% of the meal in the chopped meat, prior to the usual frying or broiling. The level of use is determined by personal flavor preference.

Many modifications, in both the production of a smoke flavored malt meal and its use in foods, will be obvious to those skilled in either the art of malting or food manufacturing. Other ways of preparing an aqueous extract of smoke, for example, could be used. Extraction columns other than ceramic may be used. I found, however, that the smoke extract discolors and loses flavor when in contact with iron. Likewise many foods can be developed, using to an advantage a wood smoke flavor adjunct, such as described in this invention. Such modifications and uses would not depart from the scope of the appended claims.

I claim:

1. A process for preparing a wood smoke-flavored cereal malt flour product which comprises:
    (a) intimately admixing water with a gaseous stream of hardwood smoke in a contacting zone,
    (b) maintaining said smoke in contact with said water in said contacting zone for a sufficient period of time for said water to extract the desirable flavor components from said hardwood smoke,
    (c) removing an aqueous extract of hardwood smoke from said contacting zone,
    (d) passing said aqueous extract of hardwood smoke through a filtering medium in order to remove undesirable wood tar products from said extract,
    (e) forming a batter by admixing said filtered extract with finely divided cereal malt,
    (f) thereafter subjecting said batter to a two-step drying operation,
    (g) the first step of the drying operation comprising reducing the moisture content of the batter to about 20% by passing a smoke-laden heated gas stream in contact with the batter,
    (h) the second step of the drying operation comprising further reducing the moisture content of the batter by passing warm dry air in contact with the partially dried batter, and
    (i) recovering a wood smoke-flavored cereal malt flour in a powdered form which can be used to flavor food products.

2. Wood smoke flavored barley malt meal with a reducing sugar content of about 700 milligrams to about 1200 milligrams per 10 grams of product, a total acid content derived from the smoke of about 1.2% to about 1.9%, and a phenolic content derived from the smoke of about 14 milligrams to about 23 milligrams per 10 grams of product.

References Cited in the file of this patent

UNITED STATES PATENTS

| | | |
|---|---|---|
| 318,768 | Lorch | May 26, 1885 |
| 511,288 | Chase | Dec. 19, 1893 |
| 1,385,352 | Allen | July 26, 1921 |
| 2,670,295 | Ash | Feb. 23, 1954 |
| 2,691,592 | Hansen | Oct. 12, 1954 |
| 2,918,376 | May et al. | Dec. 22, 1959 |

OTHER REFERENCES

"Preparation of Malt and Fabrication of Beer," 1882, by Thausing, published by Henry Corey Baird and Co. (Phila.), pp. 334–335.

"Chemistry and Technology of Wines and Liquors," 2nd edition, 1948, by Herstein et al., published by D. Van Nostrand Co., Inc. (New York), p. 115.

UNITED STATES PATENT OFFICE
CERTIFICATE OF CORRECTION

Patent No. 3,117,007　　　　　　　　　　　　　　January 7, 1964

Clifford M. Hollenbeck

It is hereby certified that error appears in the above numbered patent requiring correction and that the said Letters Patent should read as corrected below.

Column 3, Table I, fifth column, line 7 thereof, for "20.3" read -- 20.1 --.

Signed and sealed this 9th day of June 1964.

(SEAL)
Attest:

ERNEST W. SWIDER
Attesting Officer

EDWARD J. BRENNER
Commissioner of Patents